United States Patent [19]
Nguyen

[11] Patent Number: 5,178,723
[45] Date of Patent: Jan. 12, 1993

[54] METHOD AND APPARATUS FOR MAKING OPTICAL DEVICES

[75] Inventor: Hung N. Nguyen, Bensalem, Pa.

[73] Assignee: AT&T Bell Laboratories, Murray Hill, N.J.

[21] Appl. No.: 787,153

[22] Filed: Nov. 4, 1991

[51] Int. Cl.⁵ .............. H01L 21/306; B44C 1/22; C03C 15/00; C03C 25/06

[52] U.S. Cl. .................. 156/633; 156/647; 156/653; 156/657; 156/659.1; 156/662; 156/285; 156/382

[58] Field of Search ............. 156/633, 647, 653, 657, 156/659.1, 662, 285, 381, 382

[56] References Cited

U.S. PATENT DOCUMENTS 5,017,263 5/1991 Clark .................. 156/633

OTHER PUBLICATIONS

"Slow and Steady Wins the Race", by A. Chu, Bell Labs News, Dec. 18, 1990, Page 5.
"An Automated Flip-Chip Assembly Technology for Advanced VLSI Packaging", by M. K. Bartschat, *38th Electronic Components Conference Proceedings, Los Angeles, Calif., May 9-11, 1988, pp. 335-341.*

Primary Examiner—William A. Powell
Attorney, Agent, or Firm—R. B. Anderson

[57] ABSTRACT

A holder member (32) is made with a configuration of indentations (33) corresponding to the indentations (24, 25) on a substrate (23) within which optical elements (11-14, 16-19) are to be bonded. Vacuum channels (34) are made in the holder member, each communicating with one of the holder indentations (33), through which a vacuum is applied to temporarily hold the optical elements in place. The substrate containing the indentations or grooves within which optical elements are to be bonded is then positioned above the optical elements mounted in the holder member (FIG. 8). The optical elements are simultaneously bonded to the substrate by lowering the substrate to contact the elements to effect the bond. After bonding, the holder vacuum is released and the substrate (23) is withdrawn with all of the optical elements (11-14, 16-19) bonded to it.

32 Claims, 4 Drawing Sheets

METHOD AND APPARATUS FOR MAKING OPTICAL DEVICES

TECHNICAL FIELD

This invention relates to methods for making optical devices and, more particularly, to methods and apparatus for bonding elements such as glass spheres and optical fibers to substrates.

BACKGROUND OF THE INVENTION

Optical systems typically require a number of optical or photonics modules for operating on light and coupling light to and from optoelectronic devices such as lasers, light emitting diodes, and photodetectors. Such modules typically include optical fibers for transmitting light, and spherical lenses for efficiently coupling light to and from optoelectronic devices and/or optical fibers. Silicon is a favored material for the construction of such modules because of the precision with which supporting indentations and grooves can be formed in silicon for supporting and aligning the various optoelectronic devices, spherical or ball lenses, and optical fibers.

The copending patent application of A. Coucoulas, Ser. No. 679,506, filed Apr. 2, 1991, hereby incorporated herein by reference, described a method for bonding optical fibers and glass ball lenses to aluminum surfaces. Aluminum can easily be coated on silicon surfaces, and, using the Coucoulas method, one can avoid the need for epoxies or other adhesives by using heat and pressure to bond the glass elements to the aluminum coatings.

In the commercial production of devices such as optical and photonics modules, it would be desirable to use machines for bonding optical elements to the substrate. Such elements are very small, typically less than three hundred microns in diameter, they must be located with precision, and it would be desirable to provide a method which is capable of bonding with the requisite precision all of the optical elements to the substrate in one step, rather than requiring sequential bonding of each separate optical element. Besides reducing the cost of making such modules, such a method would tend to improve device quality by reducing the total time during which the substrate is heated, as required for thermo-compression bonding in accordance with the Coucoulas technique. There is therefore a long-felt need for machines and methods for the mass production of optical modules which are of reasonably low cost and which reduce the time and the required operator skill for the production of reliable and high-quality modules.

SUMMARY OF THE INVENTION

In accordance with the invention, a holder member is made with a configuration of indentations corresponding to the indentations on a substrate within which optical elements are to be bonded. Vacuum channels are made in the holder member, each communicating with one of the indentations. The optical elements mounted in the holder indentations are held in place within the indentations by an applied vacuum. The substrate containing the indentations or grooves within which the optical elements are to be mounted is then positioned above the optical elements mounted in the holder member. The optical elements are all simultaneously bonded to the substrate by lowering the substrate to contact the optical elements to effect the bond. If the Coucoulas method is used, the substrate grooves are coated with aluminum, and the substrate or the holder is heated during the contact step to make simultaneous thermo-compression bonding of all of the optical elements to the substrate. After bonding, the holder vacuum is released and the substrate is withdrawn with all the optical elements bonded to it.

These and other objects, features, and benefits of the invention will be better understood from a consideration of the following detailed description taken in conjunction with the accompanying drawing.

DETAILED DESCRIPTION

Figure 1:
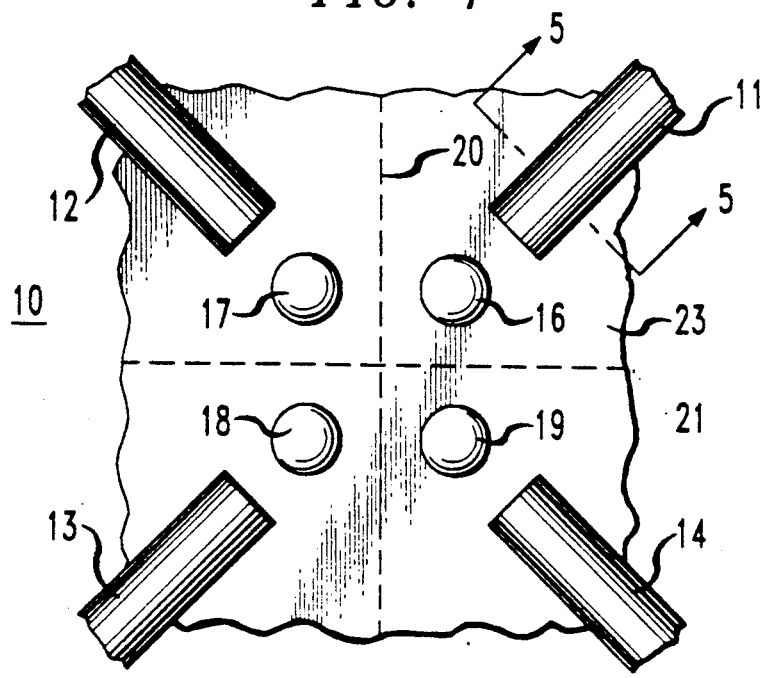
FIG. 1 is a schematic top view of an optical module which includes both optical fibers and spherical lenses.

Referring now to FIG. 1, there is shown a top schematic view of an optical module 10 which may be assembled in accordance with an illustrative embodiment of the invention. The module comprises four optical fibers 11-14 and four spherical lenses 16-19. The purpose of the module is to switch light from one optical fiber to another as desired. For example, if a mirror is inserted on a vertical plane 20, the mirror will reflect incoming light on optical fiber 11 to optical fiber 14 with lenses 16 and 19 acting to focus the light for maximizing coupling efficiency between the two fibers. Such a mirror can also reflect light from optical fiber 12 to optical fiber 13. If, instead, a mirror is positioned along horizontal plane 21, it will reflect light from optical fiber 13 to optical fiber 14 and from optical fiber 12 to optical fiber 11. It is known that for module 10 to work properly, the optical elements must be accurately located and bonded to a substrate 23.

Figure 2:
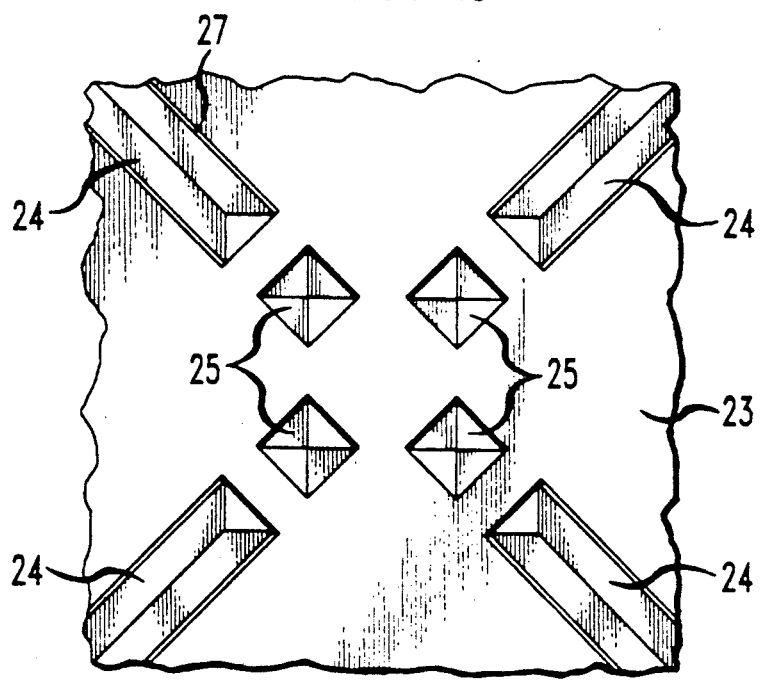
FIG. 2 is a top view of the optical module of FIG. 1 prior to bonding the optical fibers and spherical lenses to it.
Figure 3:
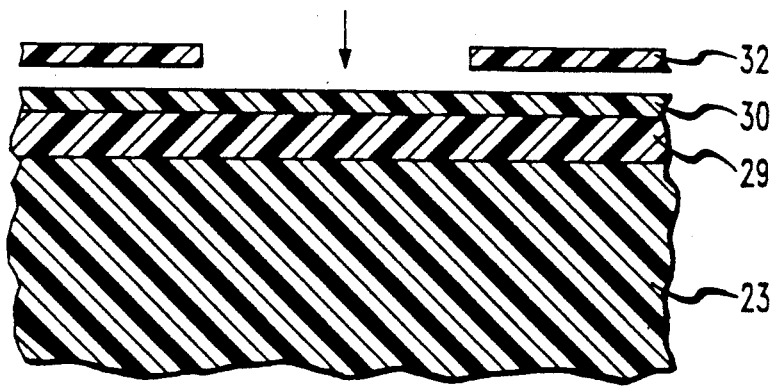
FIG. 3 is a schematic sectional view of part of the substrate of FIG. 2 at one stage of its fabrication.
Figure 4:
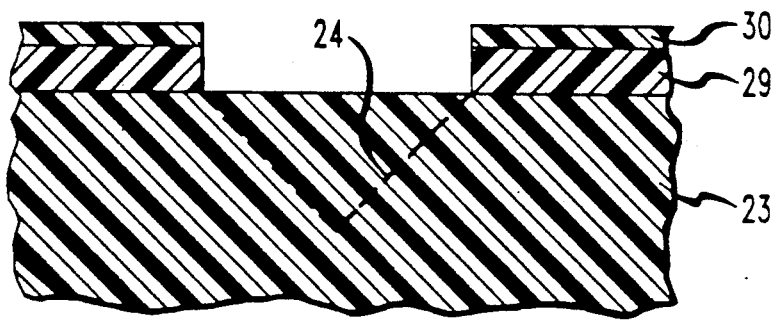
FIG. 4 is a schematic sectional view of part of the substrate of FIG. 2 at a successive stage of its fabrication.

Referring to FIG. 2, it is further known that such precise location can be assured by using as substrate 23 a monocrystalline material such as silicon and then using photolithographic masking and etching for making V-grooves 24 for holding the optical fibers, and pyramidal indentations 25 for holding the spherical lenses. Referring to FIGS. 3 and 4, the V-grooves 24 and pyramidal indentations 25 in the silicon substrate 23 are made, as is known in the art, by first growing or depositing a layer 29 of silicon dioxide over the substrate 23, and applying a thin layer of photoresist 30 over the silicon dioxide layer. The photoresist is then selectively exposed to light projected through openings in a mask 32 as indicated by the arrow. The exposed portions of the photoresist 30 are then etched away as shown in FIG. 4, the remaining layer 30 being used as a mask to permit selective etching of the silicon dioxide layer 29. Thereafter, the etched silicon dioxide layer is used as a mask to permit etching of the groove 24 into the silicon substrate 23. With proper crystallographic orientation of the substrate 23, the etching is done along crystallographic planes that results in the sloping side walls of the groove 24. Other monocrystalline substrates can alternatively be used to form grooves with sloping sidewalls.

Figure 5:
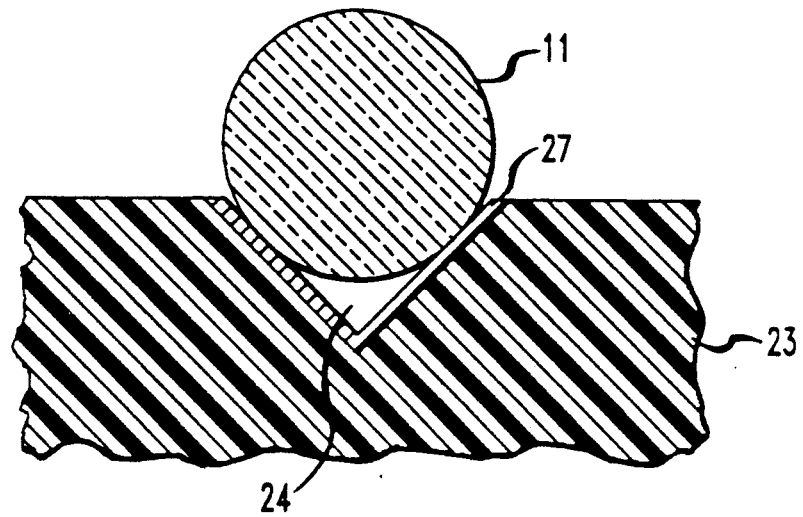
FIG. 5 is a view taken along lines 5—5 of FIG. 1.

Referring to FIG. 5, it is also known from the aforementioned Coucoulas application that the groove 24 may be coated with an aluminum layer 27 and that the optical fiber 11 can then be reliably bonded to the substrate 23 by the application of heat and pressure, that is, thermo-compression bonding. All of the optical elements, that is, fibers 11-14 and lenses 16-19 can be bonded in this way, or alternatively they can be bonded with an adhesive or a solder; in any event, such bonding is conventionally made sequentially for each individual optical element.

The main advantage of using photolithographic masking and etching of a monocrystalline substrate to form support surfaces for optical elements is that such surfaces can be made with extremely high precision resulting in high precision placement of the optical elements. Thus, for example, the central axis of optical fiber 11 of FIG. 5 can be located to within micron tolerances because the fiber must nest within groove 24 which can be formed to such tolerances. The pyramidal indentations 25 work on the same principal, and the nesting of a spherical lens in the indentation would have the same cross-sectional appearance as that of FIG. 5. Thus, for simplicity, pyramidal indentations and V-grooves will be referred to simply as "grooves."

Figure 6:
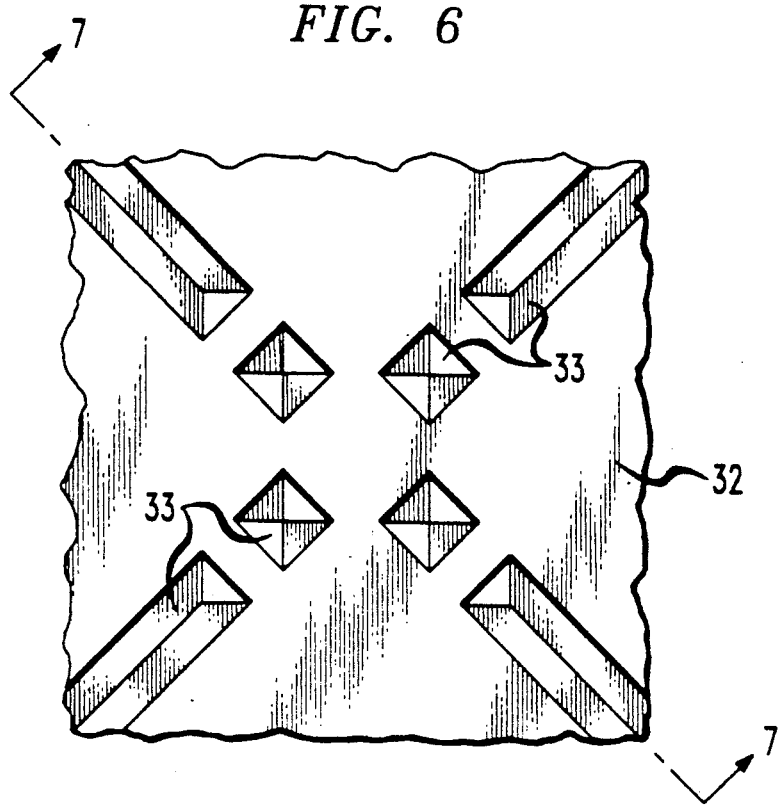
FIG. 6 is a top view of a holder member used for making the module of FIG. 1.
Figure 7:
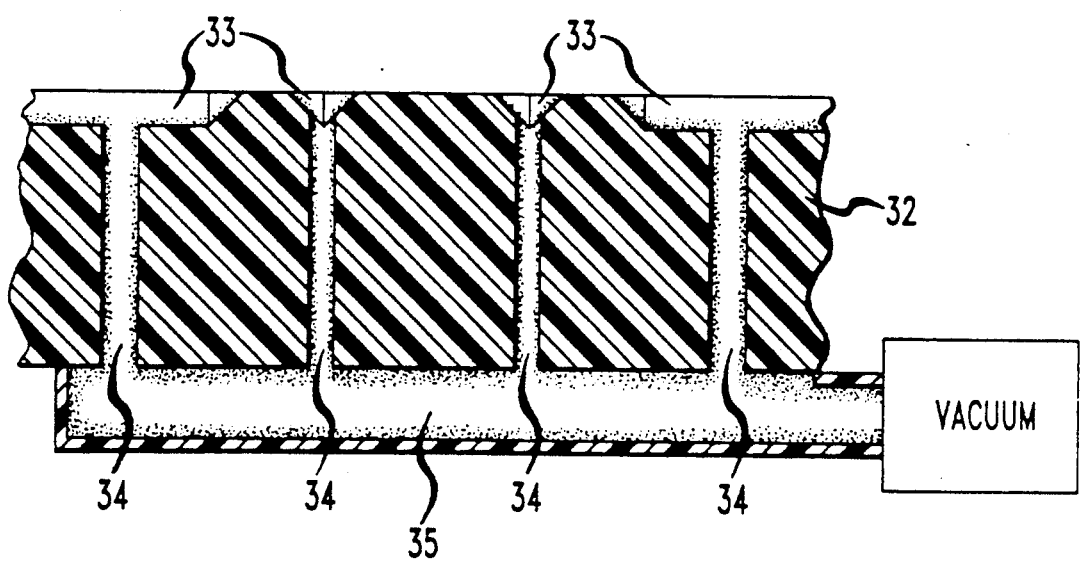
FIG. 7 is a view taken along lines 7—7 of FIG. 6.

In accordance with the invention, the optical elements are first held in a holder member in the configuration required so that they can be simultaneously bonded to the substrate 23. Referring now to FIG. 6, the holder member 32 is made of monocrystalline silicon and it includes in one surface a plurality of grooves 33 which have the same configuration as the grooves 24 and 25 of FIG. 2. The grooves 33 are identical to corresponding grooves 24 and 25, but with no aluminum coating, and are made using the same mask 32 of FIG. 3 used to make grooves 24 and 25 of FIG. 2. Referring to FIG. 7, each of the grooves 33 is connected by a vacuum channel 34 to a main vacuum channel 35. Vacuum channels 34 may be made by laser drilling as is known in the art.

Figure 8:
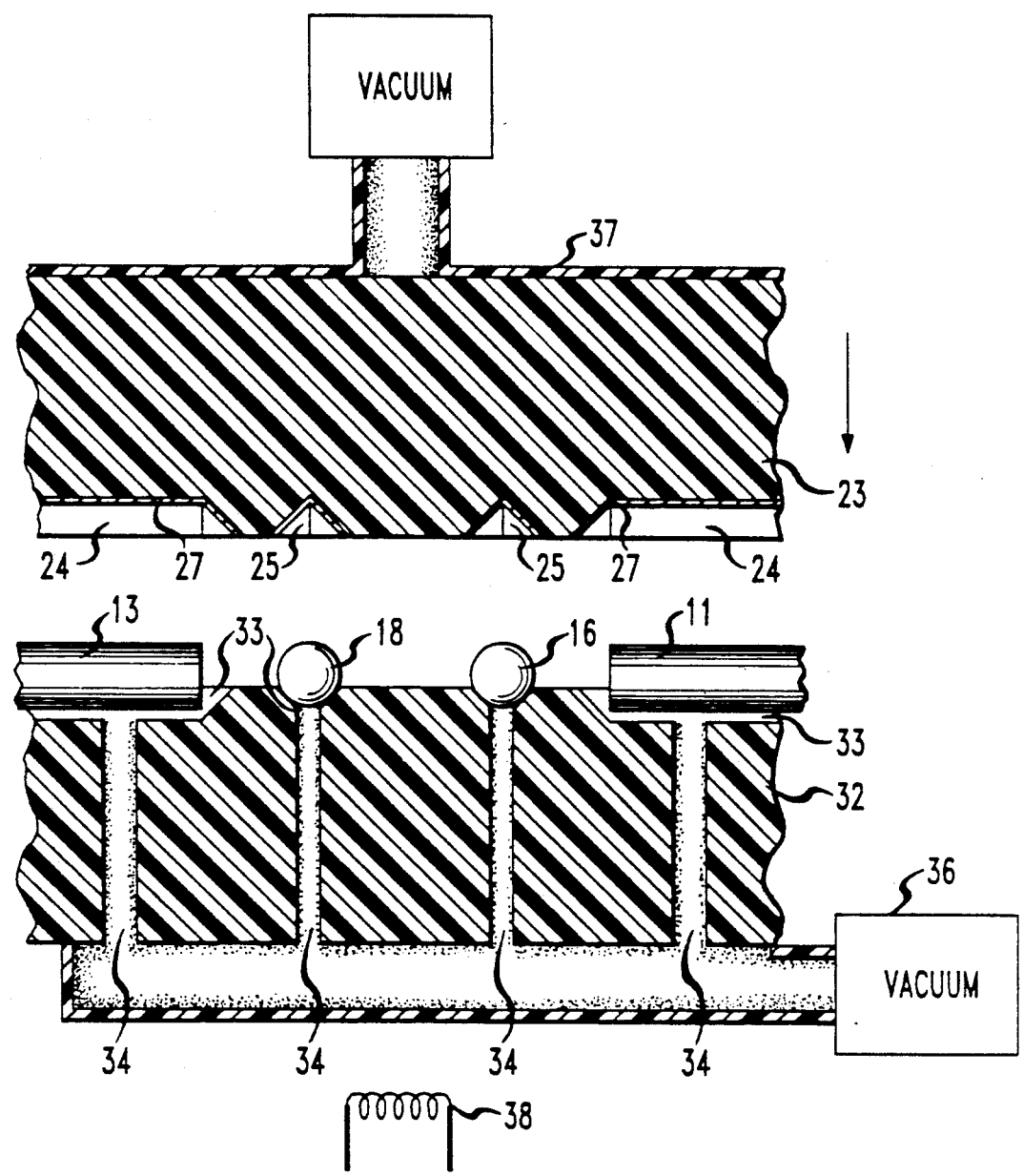
FIG. 8 is a schematic sectional view illustrating apparatus for assembling the module shown in FIG. 1.

Referring now to FIG. 8, the optical elements 11-14 and 16-19 to be assembled into an optical module are mounted in the grooves 33 of holder 32 (only optical elements 11, 16, 18, and 13 are shown in the sectional view). After being mounted, either manually or robotically, a partial vacuum is applied by a vacuum source 36 to the vacuum channels 34 to hold the optical elements in place.

The substrate 23 into which the optical elements are to be bonded is then located directly above holder 32 such that the configuration of grooves 24 and 25 matches the configuration of grooves 33 of the holder. That is, a groove 24 for an optical fiber is oriented directly above an optical fiber maintained in the holder, and a groove 25 for a spherical lens is located directly above a spherical lens held in the holder. The substrate 23 may, for example, be held in place by a vacuum holder 37. The vacuum holder 37 is then lowered, as shown by the arrow, so that the aluminum layer portions 27 of the substrate 23 make contact with the optical elements held in holder 32. The holder is illustratively heated by a heater 38 to a sufficient temperature that the compression of the substrate 23 on the optical elements effects a thermo-compression bond, in accordance with the aforementioned Coucoulas technique, between the aluminum layer and the optical elements. After bonding is complete, the vacuum produced by source 36 is released, and holder 37 is vertically raised to remove the optical elements 11-14 and 16-19 from the holder member 32.

With optical elements having diameters of three hundred microns, the applied force may be six hundred grams, and the heat applied may be sufficient to raise the temperature of the aluminum-glass junctions to three hundred fifty degrees Centigrade. The pressure may be applied for three seconds to effect the thermo-compression bond. It is of course important that the applied force be insufficient to substantially physically distort the optical elements, which could distort their optical characteristics. The bonding apparatus of FIG. 8 may be automatically cycled in a manner within the ordinary skill of a worker in the art to provide the appropriate sequence of contacting, holding, releasing the vacuum of source 36, and withdrawing the substrate holder 37.

The invention provides for the accurate placement of optical fibers and ball lenses which typically have diameters of less than three hundred microns. The fact that all of the bonds of an optical module are made simultaneously means that there must be only a single heating cycle for each module, rather than successive heating for a number of bonding cycles as would be the case if a plurality of the optical elements had to be bonded sequentially. As a practical matter, this reduces the heating of the optical elements which reduces problems associated with differential thermal expansion and reduces the likelihood of spurious melting of the plastic coatings of the optical fibers which are typically located closely adjacent the bonding apparatus. After the apparatus of FIG. 8 has been constructed, one can appreciate that numerous optical modules can be mass-produced with a great deal of precision and with a minimum of operator skill.

As mentioned in the Coucoulas application, acoustic energy can be used as an alternative to heat in the bonding step. The invention is also applicable to other methods of bonding using various solders and adhesives. Where epoxy adhesive is used, for example, compression is often required for centering the optical element, seating it within a groove, and redistributing the fluid epoxy. Likewise, the use of various solders requires a compressive force to insure reliable seating and bonding. Although the holder is preferably located vertically beneath the substrate as shown in FIG. 8, other orientations, for example, with the holder being above the substrate, could at least in theory be alternatively used. The substrate 23 could be directly heated, rather than the holder 32 as shown in FIG. 8. In the case of solder bonds, either the optical elements or the substrate grooves may be coated with solder which, after deposit, is heated to a fluid condition and, after operation, is cooled and allowed to harden. Various other embodiments and modifications may be made by those skilled in the art without departing from the spirit and scope of the invention.

I claim:

1. A method for making optical devices comprising the steps of:

making in a first surface of a substrate member a first configuration of first grooves;

making in a first surface of a holder member a second configuration of second grooves, each second groove adapted to support an optical element, with the second configuration being substantially identical to the first configuration;

making in the holder at least one vacuum channel, each second groove communicating with a vacuum channel;

mounting optical elements in each of the second grooves;

applying a partial vacuum to each vacuum channel, thereby to hold the optical elements each within a second groove;

positioning the first surface of the substrate member opposite the first surface of the holder member such that the first configuration has substantially the same orientation as the second configuration;

bonding the optical elements to the substrate such that each optical element is bonded within a first groove;

the bonding step comprising the step of causing the substrate to abut against the optical elements;

and withdrawing the substrate from the holder, thereby to remove the optical elements fromt the second grooves.

2. The method of claim 1 wherein:
at least certain ones of the optical elements comprise optical fibers.

3. The method of claim 1 wherein:
at least certain ones of the optical elements comprise spherical lenses.

4. The method of claim 1 wherein:
the holder member and the substrate member are both made of a substantially monocrystalline material;
and the first grooves and the second grooves are made by photolithographic masking and etching.

5. The method of claim 4 wherein:
the holder member and the substrate member are both made of silicon;
and the same mask used for photolithographic masking and etching of the first grooves is used for photolithographic masking and etching of the second grooves.

6. The method of claim 5 wherein:
the surfaces of the first grooves are at least partly composed of aluminum;
the optical elements are at least partly composed of glass;
and the bonding step comprises the step of heating the aluminum grooves and pressing together the aluminum and the optical elements.

7. The method of claim 1 wherein:
the optical elements comprise optical fibers each having a diameter of less than about three hundred microns and spherical lenses each having a diameter of less than about three hundred microns.

8. The method of claim 1 wherein:
the first surface of the holder member and the first surface of the substrate member are each substantially planar;
the holder member is oriented such that its first surface is substantially horizontal;
the positioning step comprises the step of displacing the first surface of the substrate member vertically upwardly from the holder member;
and the bonding step comprises the step of moving the substrate member vertically relative to the holder member such that the substrate member makes contact with the optical elements.

9. The method of claim 1 wherein:
the surfaces of the first grooves are at least partly composed of aluminum;
the optical elements are composed at least partly of glass;
the bonding step comprises the steps of applying energy to the surfaces of the first grooves and applying a compressive force to the optical elements;
and after the bonding step and before the withdrawing step, said partial vacuum is released.

10. A method for bonding a plurality of optical elements to form a predetermined configuration comprising the steps of: etching in a substrate a plurality of first indentations each adapted to hold an optical element, said indentations being arranged in said predetermined configuration; placing a plurality of optical elements on the substrate such that each optical element is supported within a first indentation; and bonding the elements in the first indentations to the substrate; characterized by the steps of:

etching in a holder member a plurality of second indentations each adapted to hold an optical element, said indentations being arranged in said predetermined configuration;

placing said plurality of optical elements in the holder member such that each optical element is supported within a second indentation;

and further characterized in that the bonding step comprises the step of forcing the first indentations against the optical elements supported within the second indentations.

11. The method of claim 10 further characterized in that:
the second indentations each communicate with a vacuum channel in the holder member;
a vacuum is applied to the vacuum channel prior to bonding for the purpose of holding the optical elements within the second indentations;
and the vacuum is released after said bonding.

12. The method of claim 11 further characterized in that:
at least certain ones of the optical elements comprise optical fibers and other ones of the optical elements comprise spherical lenses.

13. The method of claim 10 further characterized in that:
the holder member and the substrate are both made of a substantially monocrystalline material;
the first indentations and the second indentations are both made by photolithographic masking and etching;
and the same mask used for photolithographic masking and etching of the first indentations is used for photolithographic masking and etching of the second indentations.

14. The method of claim 13 further characterized in that:
the holder member and the substrate are both made of silicon.

15. The method of claim 10 further characterized in that:
the surfaces of the first indentations are at least partially covered with aluminum;
the optical elements are composed of glass;

and the bonding step comprises the step of heating the aluminum and pressing the optical elements against the aluminum.

16. The method of claim 15 further characterized in that:

the optical elements comprise optical fibers each having a diameter of less than three hundred microns and spherical lenses each having a diameter of less than three hundred microns.

17. The method of claim 10 further characterized in that:

the first indentations are made in a first planar surface of the substrate, and the second indentations are made in a second planar surface of the holder member;

the second surface of the substrate is positioned vertically above the first surface of the holder member;

and the bonding step comprises the step of moving the substrate vertically downwardly such that it makes contact with the optical elements.

18. The method of claim 11 further characterized in that:

the holder member and the substrate are both made substantially of silicon;

and the first indentations and the second indentations are both made by photolithographic masking and etching.

19. The method of claim 18 further characterized in that:

the surfaces of the first indentations are at least partially covered with aluminum;

the optical elements are composed of glass;

and the bonding step comprises the step of applying energy to the aluminum and applying a compressive force to the optical elements.

20. The method of claim 19 further characterized in that:

the optical elements comprise optical fibers each having a diameter of less than three hundred microns and spherical lenses each having a diameter of less than three hundred microns.

21. The method of claim 20 further characterized in that:

the first indentations are made in a first planar surface of the substrate, and the second indentations are made in a second planar surface of the holder member;

the second surface of the substrate is positioned vertically above the first surface of the holder member;

and the bonding step comprises the step of moving the substrate vertically downwardly such that it makes contact with the optical elements.

22. Apparatus for making optical devices comprising:

a substrate member having on a first surface a first configuration of first grooves;

a holder member having on a first surface a second configuration of second grooves, each second groove adapted to support an optical element, the second configuration being substantially identical to the first configuration;

at least one vacuum channel in the holder, each second groove communicating at one end with a vacuum channel;

means comprising the vacuum channels for holding the optical elements each within a second groove;

means for positioning the first surface of the substrate member opposite the first surface of the holder member such that the first configuration has substantially the same orientation as the second configuration;

means for bonding the optical elements to the substrate comprising means for causing the substrate to abut against the optical elements;

and means for removing the substrate from the holder, thereby to remove the optical elements from the first grooves.

23. The apparatus of claim 22 wherein:

at least certain ones of the optical elements are optical fibers.

24. The apparatus of claim 22 wherein:

at least certain ones of the optical elements are spherical lenses.

25. The apparatus of claim 22 wherein:

the holder member and the substrate member are both made of a substantially monocrystalline material;

and the first grooves and the second grooves are made by photolithographic masking and etching.

26. The apparatus of claim 25 wherein:

the holder member and the substrate member are both made of silicon.

27. The apparatus of claim 26 wherein:

the surfaces of the first grooves are at least partially composed of aluminum;

the optical elements are at least partly composed of glass;

and the bonding means comprises means for heating the aluminum grooves and pressing together the aluminum and the optical elements.

28. The apparatus of claim 22 wherein:

the optical elements comprise optical fibers each having a diameter of less than about three hundred microns, and spherical lenses each having a diameter of less than about three hundred microns.

29. The apparatus of claim 22 wherein:

the first surface of the holder member and the first surface of the substrate member are each substantially planar;

the holder member is oriented such that its first surface is substantially horizontal;

the first surface of the substrate member is displaced vertically upwardly from the holder member;

and the bonding means comprises means for moving the substrate member vertically relative to the holder member such that the substrate member makes contact with the optical elements.

30. The apparatus of claim 22 wherein:

the surfaces of the first grooves are at least partly composed of aluminum;

the optical elements comprise glass;

and the bonding means comprises means for applying energy to the aluminum grooves and means for applying a compressive force to the optical elements.

31. The apparatus of claim 30 wherein:

the means for holding the optical elements within the second grooves comprises means for applying a partial vacuum to the vacuum channels;

and the holding means further comprises means for releasing said partial vacuum after said bonding.

32. The apparatus of claim 28 wherein:

the vacuum channels are made by laser drilling.

* * * * *